United States Patent [19]
Sudo

[11] Patent Number: 6,100,675
[45] Date of Patent: Aug. 8, 2000

[54] SWITCHING REGULATOR CAPABLE OF INCREASING REGULATOR EFFICIENCY UNDER LIGHT LOAD

[75] Inventor: Minoru Sudo, Chiba, Japan

[73] Assignee: Seiko Instruments Inc., Japan

[21] Appl. No.: 09/157,732

[22] Filed: Sep. 21, 1998

[30] Foreign Application Priority Data

Sep. 22, 1997 [JP] Japan ..................................... 9-257192
Sep. 22, 1997 [JP] Japan ..................................... 9-257193
Jun. 29, 1998 [JP] Japan ..................................... 10-182794

[51] Int. Cl.[7] ................................ G05F 1/40; G05F 1/44
[52] U.S. Cl. ......................... 323/282; 323/284; 323/351
[58] Field of Search .................................. 323/282, 284, 323/285, 265, 351

[56] References Cited

U.S. PATENT DOCUMENTS

| | | | |
|---|---|---|---|
| 5,670,866 | 9/1997 | Suzuki et al. ........................... | 323/282 |
| 5,745,352 | 4/1998 | Sandri et al. ............................ | 363/41 |
| 5,747,976 | 5/1998 | Wong et al. ............................. | 323/282 |
| 5,838,147 | 11/1998 | Suzuki et al. ........................... | 323/289 |

*Primary Examiner*—Shawn Riley
*Assistant Examiner*—Bao Q. Vu
*Attorney, Agent, or Firm*—Adam & Wilks

[57] ABSTRACT

A switching regulator of which efficiency is increased while the switching regulator is operated under low load condition is disclosed. The switching regulator is arranged by: a reference voltage circuit for producing a reference voltage; an error amplifier for entering thereinto the reference voltage and a measuring voltage produced by subdividing an output voltage from the switching regulator and for amplifying a difference voltage between the reference voltage and the measuring voltage; an oscillator circuit for outputting an oscillator signal; a PWM comparator for comparing an output voltage of the error amplifier with an output voltage of the oscillator circuit; load detecting means for detecting an output load current; and efficiency varying means for varying an efficiency of the switching regulator in response to load conditions detected by the load detecting means.

20 Claims, 6 Drawing Sheets

SWITCHING REGULATOR CAPABLE OF INCREASING REGULATOR EFFICIENCY UNDER LIGHT LOAD

BACKGROUND OF THE INVENTION

1. Field of the Invention

The present invention is related to a switching regulator having means capable of increasing the efficiency of the switching regulator operated under a light load.

2. Description of the Related Art

As one typical switching regulator, a control circuit of such a conventional switching regulator as shown in FIG. 10 is known. In this conventional switching regulator, a reference voltage circuit 10, bleeder resistors 11 and 12, and an error amplifier 13 are provided. The bleeder resistors 11 and 12 divide an output voltage Vout of the switching regulator. The error amplifier 13 amplifies a difference voltage between the reference voltage of the reference voltage circuit 10 and a voltage appearing at a junction point between the bleeder resistors 11 and 12. Assuming that the output voltage of the error amplifier 13 is Verr, the output voltage of the reference voltage circuit 10 is Vref, and the voltage appearing at the junction point between the bleeder resistors 11 and 12 is Va, if Vref>Va, then the output voltage Verr of the error amplifier 13 becomes high. Conversely, if Vref<Va, then this output voltage Verr becomes low.

A PWM (Pulse Width Modulation) comparator 15 compares the output of an oscillator circuit 14, for instance, a triangular wave, with the output of the error amplifier 13 to thereby output a signal. These signals are illustrated in a waveform chart of FIG. 11. In other words, since the output voltage Verr of the error amplifier 13 is increased/decreased, the width of the output pulse from the PWM comparator 15 is controlled. The switching regulator controls the switch elements with be turned ON/OFF during the time duration of this pulse width. This operation is referred to as a so-called "PWM operation" of the switching regulator.

In FIG. 12, there is shown a structural diagram of a booster type switching regulator. A coil 21 is connected to an input power supply 20. A rectifier element 23 is connected between the coil 21 and an output capacitor 24. A load 25 is connected in parallel to the output capacitor 24. A switching regulator control circuit 30 is connected to an output terminal of the switching regulator so as to turn ON/OFF a switch element 22 of the switching regulator.

In general, in a case where the turn-ON time of a switch element in a switching regulator is prolonged, a power supply capability to a load is increased. For example, when the load becomes heavy, namely when the output load current value is increased, the output voltage of the switching regulator is lowered, and then the voltage Va subdivided by the bleeder resistors 11 and 12 is lowered. As a result, the output voltage Verr of the error amplifier 13 is increased, so that the pulse width of the PWM comparator 15 is widened, and the pulse width is controlled in such a manner that the output voltage Vout is kept constant.

Conversely, when the load becomes light, namely when the output load current value is decreased, the output voltage of the switching regulator is increased, and then the voltage Va subdivided by the bleeder resistors 11 and 12 is increased. As a result, the output voltage Verr of the error amplifier 13 is decreased, so that the pulse width of the PWM comparator 15 is narrow, and the pulse width is controlled in such a manner that the output voltage Vout is kept constant.

That is to say, the output voltage Verr of the error amplifier 13 is varied in response to the load current value, so that the pulse width of the switching regulator is controlled.

However, in the conventional switching regulator, the efficiency of the switching regulator operated under a light load is considerably lowered.

SUMMARY OF THE INVENTION

The present invention has been made to solve the above-described problem, and therefore, has an object to provide such a switching regulator capable of increasing an efficiency of this switching regulator operated under light load. More specifically, while the efficiency of the switching regulator is varied in response to an output load current value of this switching regulator, concretely speaking, an output voltage of an error amplifier, the efficiency of the switching regulator can be improved under light load.

To achieve the above-described object, a switching regulator, according to an aspect of the present invention, comprises a reference voltage circuit for producing a reference voltage; an error amplifier for entering thereinto the reference voltage and a measuring voltage produced by subdividing an output voltage from the switching regulator and for amplifying a difference voltage between the reference voltage and the measuring voltage; an oscillator circuit for outputting an oscillator signal; a PWM comparator for comparing an output voltage of the error amplifier with an output voltage of the oscillator circuit; load detecting means for detecting an output load current; and efficiency varying means for varying an efficiency of the switching regulator in response to load conditions detected by the load detecting means.

As the efficiency varying means, it is possible to arrange an oscillation frequency control circuit capable of varying an oscillation frequency of the oscillator circuit. Alternatively, it is also possible to arrange a power supply current control circuit connected to at least one of the power supply circuits of the PWM comparator and the error amplifier, for varying the current supplied to the power supply circuit.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments of the present invention will be described in detail.

ARRANGEMENT/OPERATION OF FIRST SWITCHING REGULATOR

Figure 1:
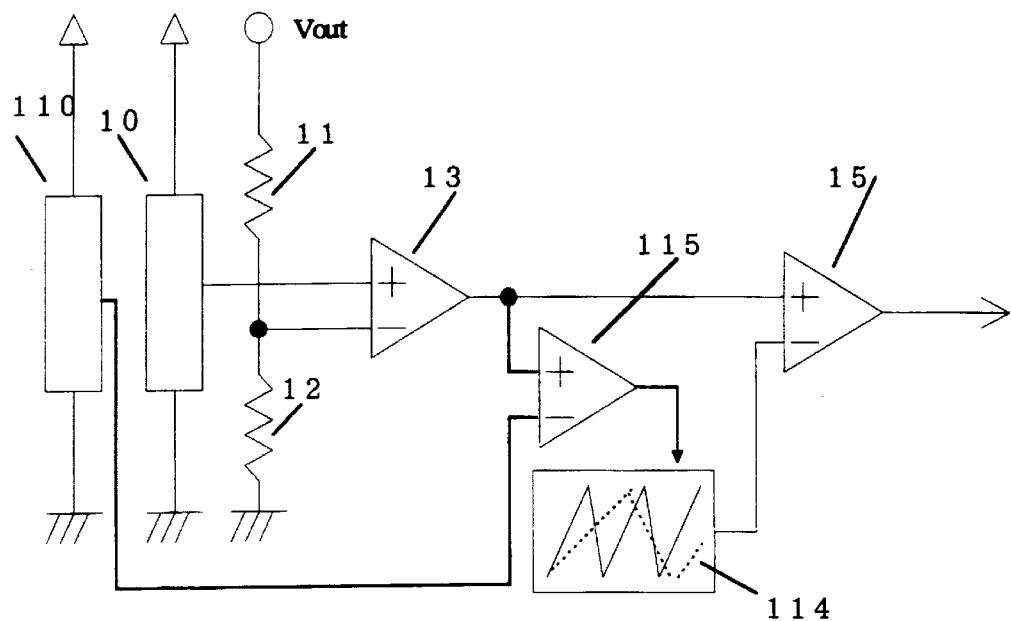
FIG. 1 is a schematic block diagram for showing a control circuit of a switching regulator according to a first embodiment of the present invention.

FIG. 1 is a schematic block diagram showing a control circuit of a switching regulator according to a first preferred embodiment of the present invention. It should be understood that a reference voltage circuit 10, bleeder resistors 11 and 12, an error amplifier 13, and a PWM comparator 15 are similar to those of the conventional switching regulator.

Another reference voltage circuit 110 outputs an arbitrary voltage between a minimum voltage of an oscillation signal produced by an oscillator circuit 114, and a maximum voltage thereof with respect to an amplitude of this oscillator signal. For example, assuming that the amplitude of the oscillator signal produced from the oscillator circuit 114 varies from 0.2 V to 1.0 V, 0.4V between 0.2V and 1.0V is set as this arbitrary voltage. A comparator 115 compares an output voltage Verr of the error amplifier 13 with the output voltage Vref 110 of the reference voltage circuit 110 to output a control signal to the oscillator circuit 114. The oscillator circuit 114 is arranged in such a manner that the oscillation frequency of the oscillator circuit 114 is varied in response to this control signal of the comparator 115. For instance, this oscillator circuit 114 is arranged as follows. When the control signal output from the comparator 115 becomes "H", the oscillator circuit 114 is oscillated at a high frequency (for example, 500 kHz), whereas when the control signal becomes "L", the oscillator circuit 114 is oscillated at a low frequency (for example, 100 kHz).

Figure 2:
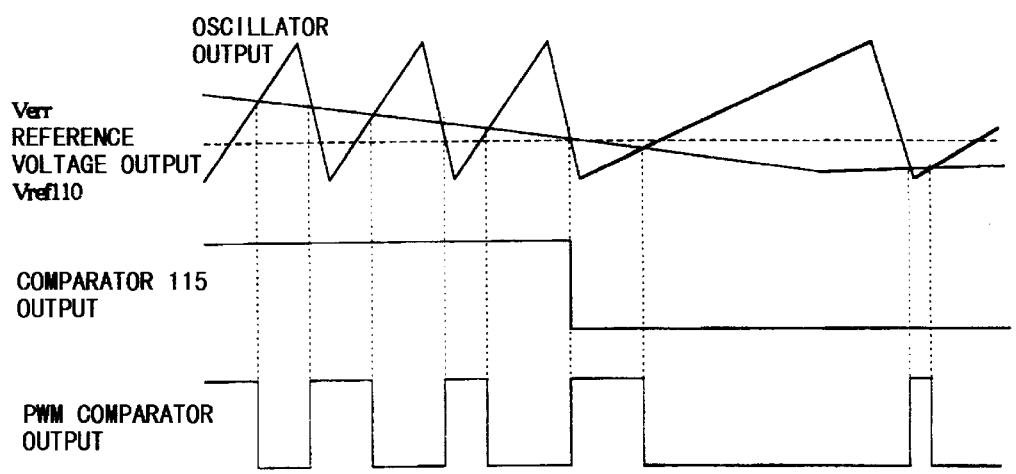
FIG. 2 is a signal waveform chart for representing operations of the switching regulator according to the first embodiment of the present invention.

In other words, when the load becomes low, or light, e.g., when the output voltage Verr of the error amplifier 13 is lower than the output voltage Vref 110 of the reference voltage 110, the oscillation frequency is decreased and thus a pulse width of a control signal capable of turning ON an SW element is increased. This operation is explained from a signal waveform chart shown in FIG. 2.

Assuming now that the output voltage Vref 110 of the reference voltage circuit 110 is set to a 10% of a duty ratio (The duty ratio means the ratio of an ON-time period of a switch element to the oscillation time period. In this case, ON-duration time becomes 0.2 $\mu$s.) at a high frequency of 500 kHz, when the output voltage Verr of the error amplifier 13 becomes higher than the reference voltage Vref (Verr>Vref 110), namely under a heavy load, the SW element is ON/OFF-controlled at a frequency of 500 kHz. Conversely, when Verr<Vref 110, the oscillator circuit 114 is oscillated at a frequency of 100 kHz. As a result, assuming now that the pulse width is equal to 10% of the oscillation time period at this time, the SW element is turned ON by a wide pulse width of 1 $\mu$s which is 5 times wider than that of the oscillation signal at the frequency of 500 kHz.

Figure 3:
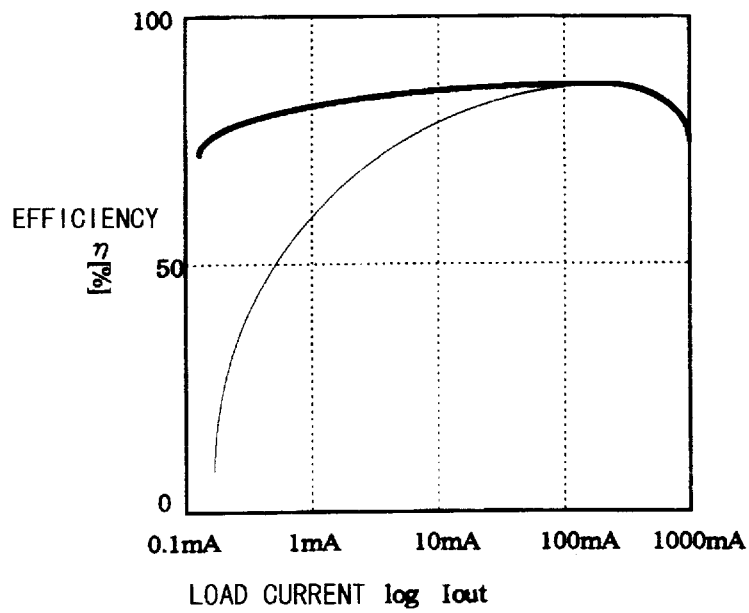
FIG. 3 is an explanatory diagram for explaining an efficiency of the switching regulator according to the first embodiment of the present invention and the efficiency of the conventional switching regulator.

In such a case that when the load becomes light, the SW element is turned ON by the wide pulse width, there is a drawback in that the ripple voltage is increased. However, since the total number of switching operations is decreased, the switching loss is decreased and therefore the efficiency of this switching regulator under a light, or low load condition can be increased. When the output voltage of the error amplifier 13 is further lowered, although the pulse width becomes narrow, since the switching frequency is low, the switching loss under a light load condition is decreased and thus the efficiency of this switching regulator can be improved. FIG. 3 represents a characteristic curve in which an abscissa indicates an output load current, and an ordinate denotes an efficiency of the switching regulator.

Figure 10:
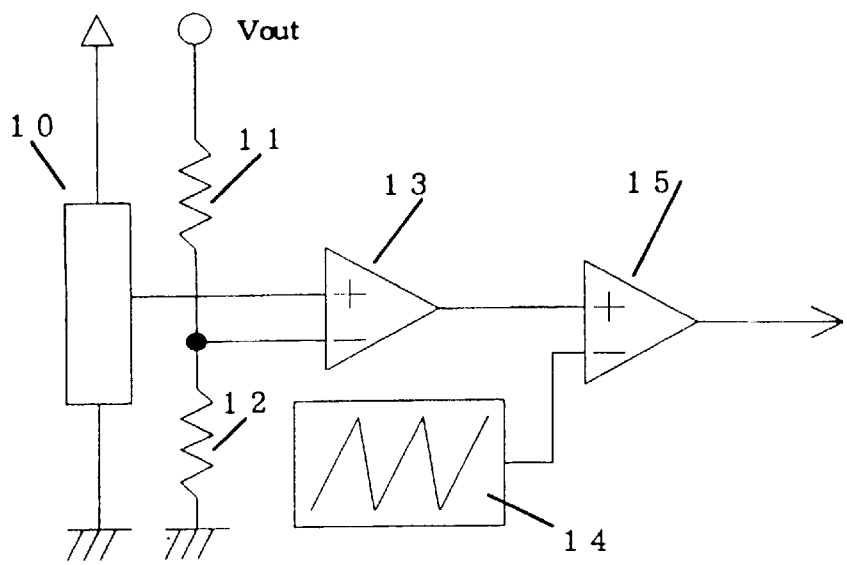
FIG. 10 is a schematic block diagram for indicating the conventional switching regulator.
Figure 11:
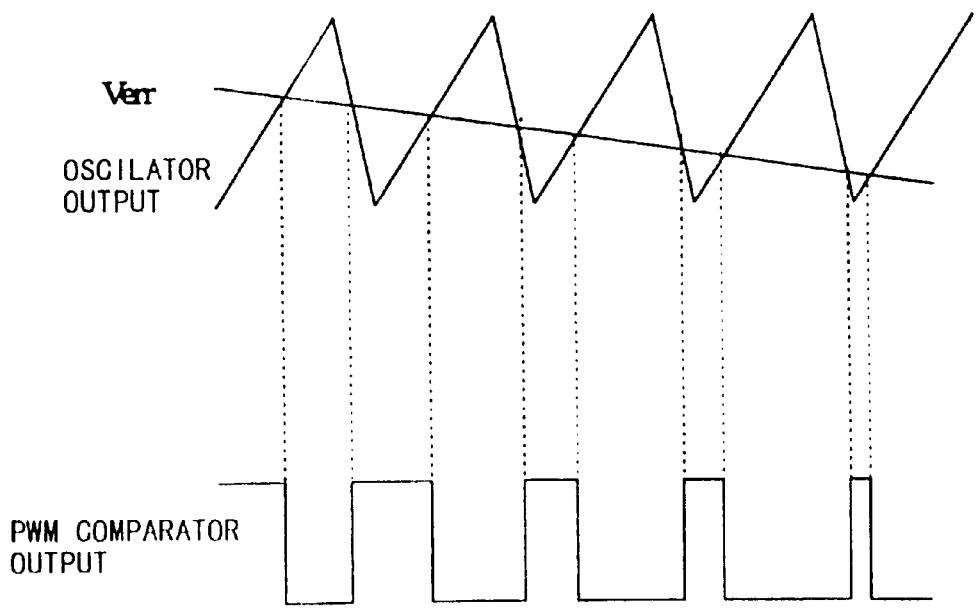
FIG. 11 is a signal waveform diagram for representing operations of the conventional switching regulator.
Figure 12:
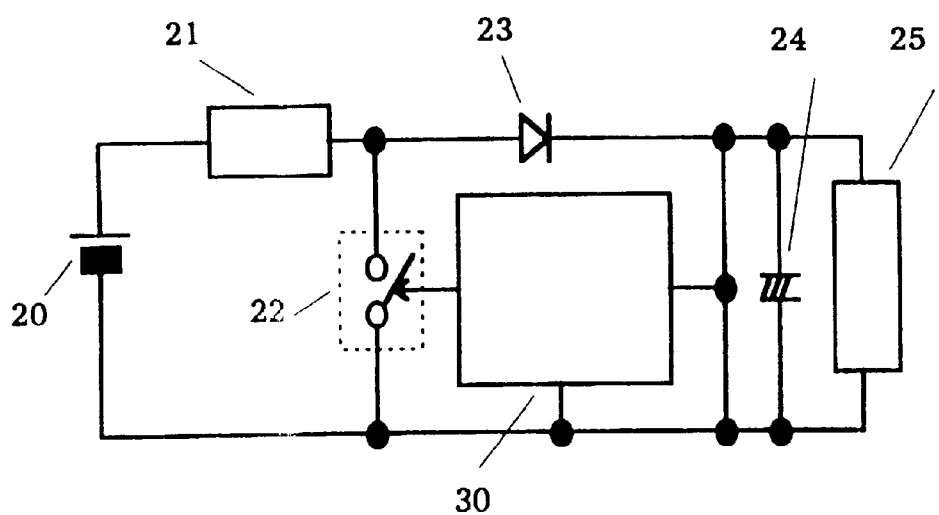
FIG. 12 is a schematic block diagram for representing the conventional booster type switching regulator.

In the conventional switching regulator of FIG. 10, the switching loss under light load condition is increased, and therefore the efficiency of this switching regulator is greatly lowered. To the contrary, in the switching regulator according to the present invention, when the load becomes light, since the total switching times are reduced, the efficiency of this switching regulator can be increased.

On the other hand, in a case where the load becomes heavy, i.e., the output voltage Verr of the error amplifier 13 is higher than the output voltage Vref 110 of the reference voltage circuit 110, since the switching regulator of the present invention is operated in a similar manner to that of the conventional switching regulator, there is no change in the efficiency of this switching regulator and the ripple voltage thereof.

Also, the output voltage value of the error amplifier 13 at which the oscillation frequency is switched can be adjusted by controlling the voltage value of the reference output voltage Vref 110 of the reference voltage circuit 110. Therefore, it is obvious that one can adjust arbitrarily the output load current value of the switching regulator at which the oscillation frequency is switched.

ARRANGEMENT/OPERATION OF SECOND SWITCHING REGULATOR

Figure 4:
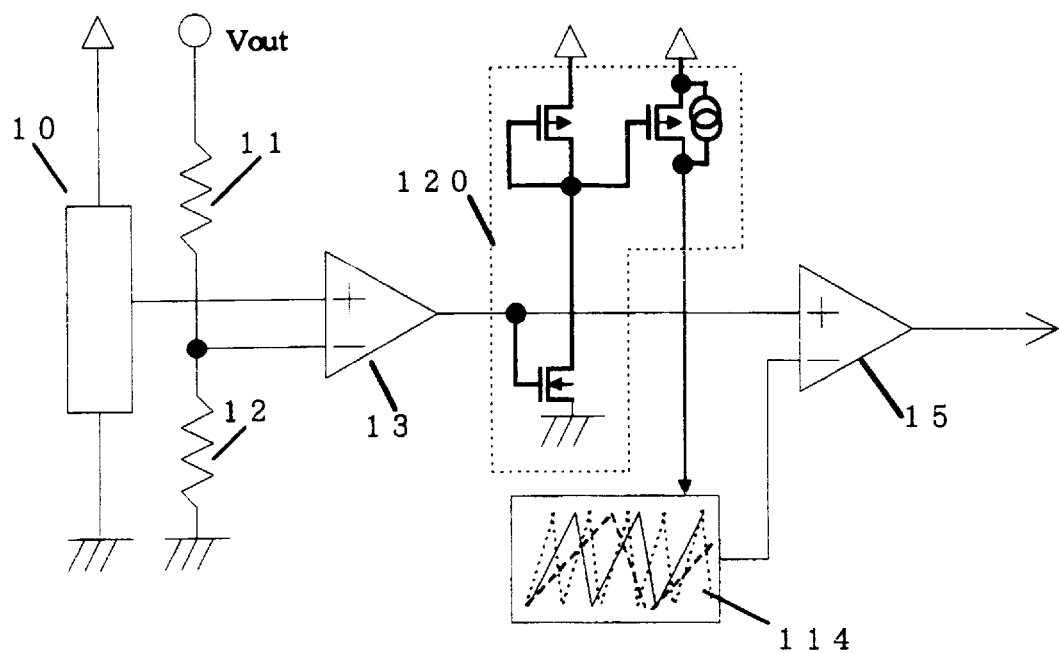
FIG. 4 is a schematic block diagram for showing a control circuit of a switching regulator according to a second embodiment of the present invention.

FIG. 4 is a schematic block diagram for showing a control circuit of a switching regulator according to a second preferred embodiment of the present invention. It should be understood that a reference voltage circuit 10, bleeder resistors 11 and 12, an error amplifier 13, and a PWM comparator 15 are similar to those of the conventional switching regulator.

Figure 5:
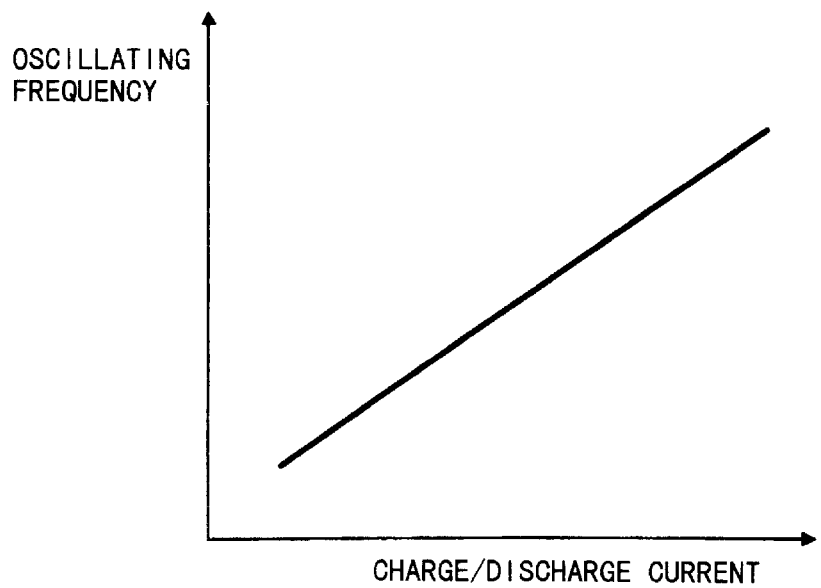
FIG. 5 is an explanatory diagram for explaining a relationship between charge/discharge currents of an oscillator circuit and an oscillator frequency thereof employed in the switching regulator according to the second embodiment of the present invention.

The second embodiment is different from the first embodiment in the following manner. That is, an oscillation frequency of an oscillator circuit 114 is changed continuously in response to the output voltage Verr of the error amplifier 13. A voltage-to-current converting circuit 120 changes a current value of the oscillator circuit 114 continuously in response to the output voltage Verr of the error amplifier 13. For instance, if it is assumed that the oscillator circuit 114 is an oscillator circuit having an oscillation frequency that is determined by charging/discharging a capacitor, if this charging/discharging current of the oscillator circuit 114 is controlled based upon the output voltage Verr of the error amplifier 13, then the oscillation frequency is changed substantially direct proportional to the charging/discharging current, as illustrated in FIG. 5.

In other words, when the load given to the switching regulator is light, the charging/discharging current of the oscillator circuit 114 is decreased, namely the oscillation frequency is lowered. As a result, a total number of switching operation of this switching regulator is decreased when the load is light, so that the efficiency of the switching regulator can be improved. Conversely, when the load is heavy, the charging/discharging current of the oscillator circuit 114 is increased, and the oscillation frequency is increased. As a consequence, although the efficiency is more or less lowered, it is possible to achieve a better response characteristic and further, a low ripple voltage.

In the above-described embodiment, the oscillation frequency of the oscillator circuit 114 is changed in response to the output voltage value of the error amplifier 13. The present invention is not limited thereto. Alternatively, even when the oscillation frequency is changed in response to a signal capable of discriminating the heavy load condition from the light load condition, a similar effect may be achieved. As a signal that is capable of discriminating a heavy load condition from a light load condition, the following signals may be used. For example, a signal is supplied from an external circuit of this switching regulator, and another signal having an output voltage in response to the output pulse width of the PWM comparator 15.

ARRANGEMENT/OPERATION OF THIRD SWITCHING REGULATOR

Next, a description will now be made of a third embodiment of the present invention.

Figure 6:
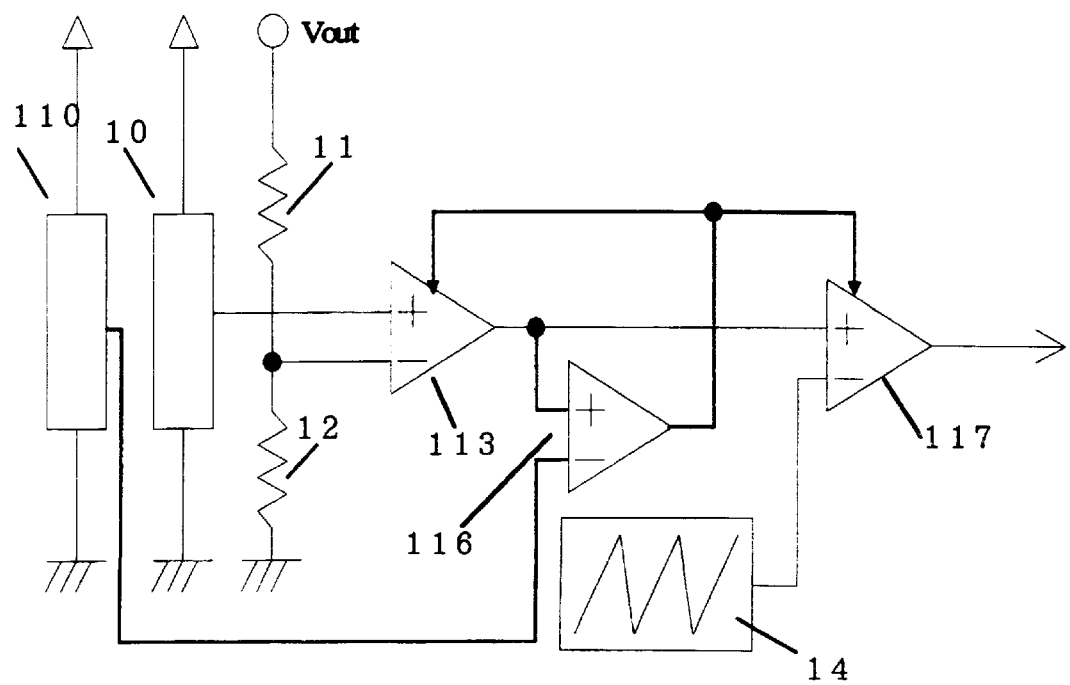
FIG. 6 is a schematic block diagram for showing a control circuit of a switching regulator according to a third embodiment of the present invention.

FIG. 6 is a schematic block diagram for showing a control circuit of a switching regulator according to a third preferred embodiment of the present invention. It should be understood that a reference voltage circuit 10, bleeder resistors 11 and 12, and an oscillator circuit 14 are similar to those of the conventional switching regulator. Both an error amplifier 113 and a PWM comparator 117 are operated in a similar manner to that of the conventional switching regulator.

Another reference voltage circuit 110 outputs an arbitrary voltage between a minimum voltage of an oscillation signal produced from an oscillator circuit 14, and a maximum voltage thereof with respect to an amplitude of this oscillator signal. For example, assuming now that the amplitude of the oscillator signal produced from the oscillator circuit 14 varies from 0.2V to 1.0V, 0.4V between 0.2V and 1.0V is set as this arbitrary voltage. A comparator 116 compares an output voltage Verr of the error amplifier 113 with an output voltage Vref 110 of a reference voltage circuit 110 to output a control signal to the error amplifier 113 and the PWM comparator 117. The error amplifier 113 and the PWM comparator 117 are arranged in such a manner that current consumption of the error amplifier 113 and PWM comparator 117 are varied in response to the control signal of this comparator 116. For example, when the control signal outputted from the comparator 116 becomes "H", the current consumption of the error amplifier 113 and the PWM comparator 117 is large (for example, 10 μA each). Conversely, when the control signal becomes "L", the current consumption is decreased (for example, 1 μA). As a concrete means for varying the current consumption, for instance, one constant current source of 9 μA and the other constant current source of 1 μA are connected to the error amplifier 113 and the PWM comparator 117. A switching element is provided in a current path in the constant current source of 9 μA, and the switching element is turned ON/OFF in response to the signal from the comparator 116, so that the current consumption can be varied.

Figure 7:
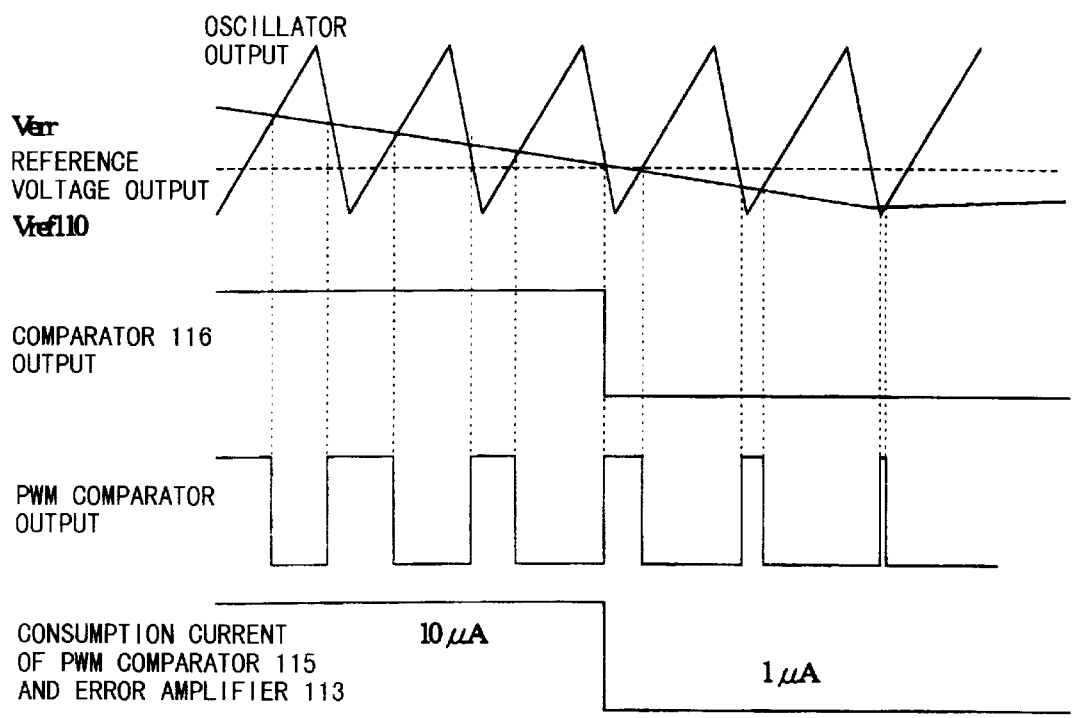
FIG. 7 is a signal waveform chart for representing operations of the switching regulator according to the third embodiment of the present invention.

In other words, when the load becomes low, or light, e.g., when the output voltage Verr of the error amplifier 113 is lower than the output voltage Vref 110 of the reference voltage 110, the current of the control circuit of the switching regulator is decreased. This operation is explained by a signal waveform chart shown in FIG. 7.

It is now assumed that when the output of the comparator 116 becomes "H", current consumption of the switching regulator is 30 μA, and 20 μA among 30 μA is consumed by the error amplifier 113 and the PWM comparator 117. Assuming also that the load of the switching regulator becomes light substantially equal to the current consumption of the switching regulator to be 30 μA, the resultant efficiency of the switching regulator is apparently lowered to less than a half of the regular efficiency. However, under such a light load condition, if the output of the comparator 116 becomes "L" and the current consumption of the error amplifier 113 and the PWM comparator 117 is reduced to 2 μA, then the resultant current consumption of the switching regulator becomes 12 μA. At this condition, the efficiency of the switching regulator can be increased up to approximately 70%.

Figure 8:
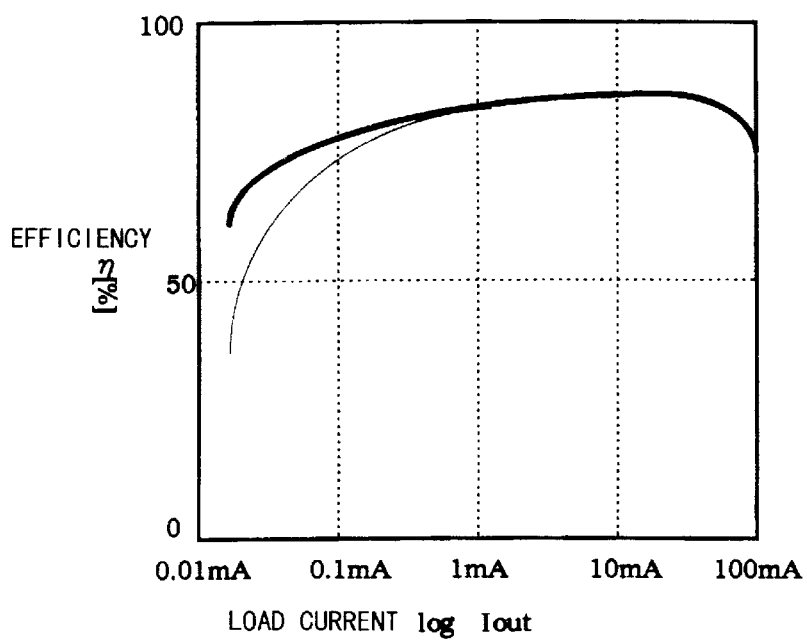
FIG. 8 is an explanatory diagram for explaining an efficiency of the switching regulator according to the third embodiment of the present invention and the efficiency of the conventional switching regulator.

There is a drawback in that the response of the switching regulator is delayed in such a case that when the load is light, since the currents of the error amplifier and the PWM comparator are reduced. However, when a load is light, a operation mode of a portable electronic appliance is generally a waiting mode under which there is a small variation in the power supply voltage and the load. As a consequence, in general, there is a large advantage in that the efficiency can be improved under the light load condition. FIG. 8 represents a characteristic curve in which an abscissa indicates an output load current, and an ordinate denotes an efficiency of the switching regulator.

In the conventional switching regulator of FIG. 10, the switching loss under a light load condition is increased by the current consumption of the switching regulator, and therefore the efficiency of this switching regulator is greatly lowered. To the contrary, in the switching regulator according to the present invention, when the load becomes light, since the current consumption of the switching regulator is reduced, the efficiency of the switching regulator can be increased.

On the other hand, in such a case that the load becomes heavy, i.e., the output voltage Verr of the error amplifier 113 is higher than the output voltage Vref 110 of the reference voltage circuit 110, since the switching regulator of the present invention is operated in a similar manner to that of the conventional switching regulator, there is no change in the efficiency of the switching regulator and the response characteristic thereof.

Also, the output voltage value of the error amplifier 113 when the oscillation frequency is switched can be adjusted by controlling the voltage value of the output voltage Vref 110 of the reference voltage circuit 110. Therefor it is obvious that one may adjust arbitrarily the output load current value of the switching regulator at which the oscillation frequency is switched.

ARRANGEMENT/OPERATION OF FOURTH SWITCHING REGULATOR

Figure 9:
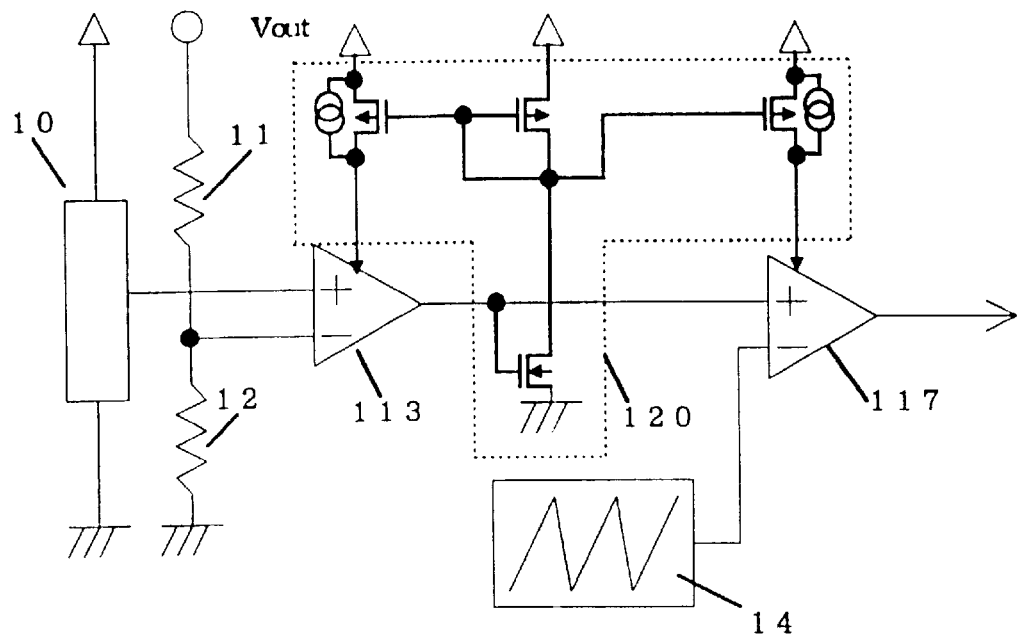
FIG. 9 is a schematic block diagram for showing a control circuit of a switching regulator according to a fourth embodiment of the present invention.

FIG. 9 is a schematic block diagram for showing a control circuit of a switching regulator according to a fourth preferred embodiment of the present invention. It should be understood that a reference voltage circuit 10, bleeder resistors 11 and 12, and an oscillator circuit 14 are similar to those of the conventional switching regulator. Both an error amplifier 113 and a PWM comparator 117 are operated in a similar manner to that of the conventional switching regulator.

The fourth embodiment is different from the third embodiment in the following manner. That is, current consumption of the error amplifier 113 and the PWM comparator 117 are changed continuously in response to the output voltage Verr of the error amplifier 113. A voltage-to-current converting circuit 120 changes the current consumption of the error amplifier 113 and the PWM comparator 117 continuously in response to the output voltage Verr of the error amplifier 113.

In other words, when the load is light, namely when the output voltage of the error amplifier 113 is low, the current consumption of the error amplifier 113 and the PWM comparator 117 are reduced, so that the efficiency of the switching regulator under a light load condition is increased. Conversely, when the load is heavy, the current consumption of the error amplifier 113 and the PWM comparator 117 are increased so as to improve the response characteristic of the switching regulator. When the load is heavy, other switching losses than the current consumption of the switching regulator may function as a major factor. Therefore, even when the current consumption of the error amplifier 113 and the PWM comparator 117 is more or less increased, the efficiency is not substantially lowered.

In the above-described third and fourth embodiments, both the current consumption of the error amplifier and the PWM comparator is varied in response to variations in the output voltage of the error amplifier. Alternatively, even when only the current consumption of one of these devices is changed, although the effect is reduced, the efficiency under a light load condition may be apparently improved.

In the above-explained embodiment, the current consumption of the error amplifier and the PWM comparator is changed in response to the output voltage value of the error amplifier. The present invention is not limited thereto. Alternatively, the current consumption. is changed in response to a signal capable of discriminating a heavy load condition from a light load condition, and a similar effect may be achieved thereby. As a signal capable of discriminating a heavy load condition from a light load condition, the following signals may be used. For example, a signal supplied from an external circuit of the switching regulator, and another signal having an output voltage which varies in response to the output pulse width of the PWM comparator 117.

As previously described in detail, in accordance with the switching regulator of the present invention, efficiency varying means for varying the efficiency of the switching regulator in response to the load condition detection signal is employed. The efficiency varying means may comprise an oscillation frequency control circuit for changing the oscillation frequency of the oscillator circuit, or a power supply current control circuit connected to at least one of the power supply circuits of the error amplifier and the PWM comparator, and for changing the current supplied to the power supply circuit. In accordance with the former arrangement, the oscillation frequency of the oscillator circuit is lowered under a low load condition, and the switching operation is carried out by a wide pulse width, so that the efficiency under a low load condition can be increased. In accordance with the latter arrangement, since the current consumption of the switching regulator is lowered under a light load condition, the efficiency under the light load condition can be increased.

The entire disclosure of Japanese Patent Application No. 10-153377 filed on Jun. 2, 1998 including specification, claims, drawings and summary is incorporated herein by reference in its entirety.

What is claimed is:

1. A switching regulator comprising:
a first reference voltage circuit for producing a first reference voltage;
an error amplifier for receiving the first reference voltage and a divided portion of an output voltage of the switching regulator and for amplifying a difference in voltage levels therebetween;
an oscillator circuit for outputting a first oscillator signal having a first oscillation frequency and a second oscillator signal having a second oscillation frequency higher than the first oscillation frequency, the first and second oscillator signals each comprising a periodic signal having a first portion for turning on a switching element of the switching regulator and a second portion for turning off the switching element;
a PWM comparator for comparing an output voltage of the error amplifier with the oscillator signal output by the oscillator circuit;
a second reference voltage circuit for producing a second reference voltage having a level set between an absolute value of a maximum amplitude and a minimum amplitude of the oscillator signal;
a second comparator for comparing the second reference voltage with a voltage output by the error amplifier; and
an oscillation frequency control circuit for controlling the oscillator circuit in response to an output of the second comparator so that when the output voltage of the error amplifier is lower than the second reference voltage, the first oscillator signal having the first oscillation frequency is output by the oscillator circuit, whereas when the output voltage of the error amplifier is higher than the second reference voltage, the second oscillator signal having the second oscillation frequency is output by the oscillator circuit, such that the first and second portions of the periodic signal output by the oscillator circuit are varied to vary the efficiency of the switching regulator based upon load conditions.

2. A switching regulator comprising:
a first reference voltage circuit for producing a first reference voltage;
a first error amplifier for receiving the first reference voltage and a divided portion of an output voltage of the switching regulator and for amplifying a difference in voltage levels therebetween;
a voltage controlled oscillator circuit for outputting an oscillator signal and having a control voltage input circuit, the oscillation frequency of the oscillator signal being varied in response to a control voltage supplied to the control voltage input circuit, the oscillator signal comprising a periodic signal having a first portion for turning on a switching element and a second portion for turning off the switching element
a PWM comparator for comparing an output voltage of the first error amplifier with the oscillator signal output by the oscillator circuit;
a second reference voltage circuit for producing a second reference voltage having a level set between an absolute value of a maximum amplitude and a minimum amplitude of the oscillator signal;

a second error amplifier for receiving the second reference voltage and an output voltage of the first error amplifier, and for amplifying a second difference voltage between the second reference voltage and the output voltage of the first error amplifier; and an oscillation frequency control circuit having means for controlling the oscillator circuit so that the second difference voltage output by the second error amplifier is supplied to the control voltage input circuit of the oscillator circuit, so that the oscillation frequency of the oscillator signal is continuously varied in response to the second difference voltage.

3. A switching regulator comprising:

a reference voltage circuit for producing a reference voltage;

an error amplifier for receiving the reference voltage and a divided portion of an output voltage of the switching regulator and for amplifying a difference in voltage levels therebetween;

an oscillator circuit for outputting an oscillator signal;

a PWM comparator for comparing an output voltage of the error amplifier with the oscillator signal output by the oscillator circuit;

load detecting means for detecting an output load current; and efficiency varying means for varying an efficiency of the switching regulator in response to load conditions detected by the load detecting means, the efficiency varying means comprising a power supply current control circuit connected to a power supply circuit of at least one of the error amplifier and the PWM comparator for changing a current supplied to the respective power supply circuit.

4. A switching regulator comprising:

a reference voltage circuit for producing a reference voltage;

an error amplifier for receiving the reference voltage and a divided portion of an output voltage of the switching regulator and for amplifying a difference in voltage levels therebetween;

an oscillator circuit for outputting an oscillator signal;

a PWM comparator for comparing an output voltage of the error amplifier with the oscillator signal output by the oscillator circuit;

load detecting means for detecting an output load current, the load detecting means comprising a second reference voltage circuit for producing a second reference voltage, and a second comparator for comparing the second reference voltage with a difference voltage output by the error amplifier; and efficiency varying means for varying an efficiency of the switching regulator in response to load conditions detected by the load detecting means, the efficiency varying means comprising a power supply current control circuit for supplying a first current when the difference voltage is lower than the second reference voltage, and for supplying a second current different from the first current when the error amplifier output voltage is higher than the second reference voltage.

5. A switching regulator comprising:

a first reference voltage circuit for producing a first reference voltage;

a first error amplifier for receiving the first reference voltage and a divided portion of an output voltage of the switching regulator and for amplifying a difference in voltage levels therebetween;

an oscillator circuit for outputting an oscillator signal;

a PWM comparator for comparing an output voltage of the first error amplifier with the oscillator signal output by the oscillator circuit;

load detecting means for detecting an output load current, the load detecting means comprising a second reference voltage circuit for producing a second reference voltage and a second error amplifier for receiving the second reference voltage and a voltage output by the first error amplifier, and for amplifying a second difference voltage between the second reference voltage and the output voltage of the first error amplifier; and efficiency varying means comprising a power supply current control circuit for producing a supply current which varies continuously with the second difference voltage.

6. A switching regulator comprising:

a reference voltage generating circuit for generating a reference voltage;

an error amplifier for receiving the reference voltage and a divided portion of an output voltage of the switching regulator and for amplifying a difference in voltage levels therebetween;

an oscillator circuit for outputting an oscillator signal;

a PWM comparator for comparing an output voltage of the error amplifier with an output voltage of the oscillator circuit;

a second reference voltage circuit for generating a second reference voltage;

a second comparator for comparing the second reference voltage with the voltage output by the error amplifier; and a power supply current control circuit connected to a power supply circuit of at least one of the error amplifier and the PWM comparator, for supplying a first current to the power supply circuit when the error amplifier output voltage is lower than the second reference voltage, and for supplying a second current different from the first current when the difference voltage is higher than the second reference voltage.

7. A switching regulator comprising:

a reference voltage generating circuit for generating a reference voltage;

an error amplifier for receiving the reference voltage and a divided output voltage of the switching regulator and for amplifying a difference voltage between the reference voltage and the divided voltage;

an oscillator circuit for outputting an oscillator signal;

a PWM comparator for comparing an output voltage of the error amplifier with an output voltage of the oscillator circuit;

a second reference voltage circuit for generating a second reference voltage;

a second error amplifier for receiving the second reference voltage and the voltage output by the error amplifier, and for amplifying a second difference voltage between the second reference voltage and the error amplifier output voltage; and a power supply current control circuit connected to a power supply circuit of at least one of the error amplifier and the PWM comparator for continuously varying the supply current in response to variations in the second difference voltage.

8. A switching regulator for producing a regulated output voltage, comprising: a difference amplifier for outputting a signal representing a difference between a divided portion of the regulated output voltage and a reference voltage; an oscillator for outputting a periodic voltage signal; a comparator for comparing an output voltage of the difference amplifier and the periodic voltage signal; and efficiency varying means for controlling the oscillator so as to vary the frequency of the periodic voltage signal and a power supply of one of the difference amplifier and the comparator so as to vary a supply current to one of the difference amplifier and the comparator in accordance with an output load current of the switching regulator.

9. A switching regulator according to claim 8; further comprising a reference voltage generating circuit for generating a second reference voltage, and a second comparator for comparing the second reference voltage with a voltage output by the difference amplifier.

10. A switching regulator according to claim 9; wherein the oscillator comprises a voltage controlled oscillator for producing a periodic voltage signal having a frequency which varies in accordance with the level of an input voltage, and wherein the output of the second comparator is supplied to the voltage controlled oscillator so that the frequency of the periodic voltage signal output by the oscillator may have two different values depending upon the output of the second comparator.

11. A switching regulator according to claim 8; wherein the oscillator control means comprises load detecting means for detecting the output load current, and efficiency varying means for varying an efficiency of the switching regulator in response to load conditions detected by the load detecting means.

12. A switching regulator according to claim 11; wherein the load detecting means comprises a reference voltage generating circuit for generating a second reference voltage, and a second comparator for comparing the second reference voltage with a voltage output by the difference amplifier; the oscillator includes means for generating a first periodic voltage signal having a first frequency and a second periodic voltage signal having a second frequency higher than the first frequency; and the efficiency varying means comprises an oscillation frequency control circuit for controlling the oscillator so that when the output voltage of the difference amplifier is lower than the second reference voltage, the first periodic voltage signal is output by the oscillator, whereas when the output voltage of the difference amplifier is higher than the second reference voltage, the second periodic voltage signal is output by the oscillator.

13. A switching regulator according to claim 11; wherein the load detecting means comprises a reference voltage generating circuit for generating a second reference voltage, and a second difference amplifier for receiving the second reference voltage and an output voltage of the first difference amplifier, and for amplifying a second difference voltage between the second reference voltage and the output voltage of the first difference amplifier; and wherein the oscillator comprises a voltage-controlled oscillator circuit having a control voltage input circuit, the oscillation frequency of which is varied in response to a control voltage supplied to the control voltage input circuit; and the efficiency varying means comprises an oscillation frequency control circuit having means for controlling the oscillator circuit so that the second difference voltage output by the second difference amplifier is supplied to the efficiency varying means, the second difference voltage is supplied to the control voltage input circuit of the oscillator circuit, and the oscillation frequency is continuously varied in response to the second difference voltage.

14. A switching regulator according to claim 11; wherein the efficiency varying means comprises a power supply current control circuit connected to a power supply circuit of at least one of the difference amplifier and the comparator for changing a current supplied to the respective power supply circuit.

15. A switching regulator according to claim 11; wherein the load detecting means comprises a reference voltage circuit for producing a second reference voltage, and a second comparator for comparing the second reference voltage with a difference voltage output by the error amplifier; and the efficiency varying means comprises a power supply current control circuit for supplying a first current when the difference voltage is lower than the second reference voltage, and for supplying a second current different from the first current when the error amplifier output voltage is higher than the second reference voltage.

16. A switching regulator according to claim 11; wherein the load detecting means comprises a reference voltage circuit for producing a second reference voltage, and a second error amplifier for receiving the second reference voltage and a voltage output by the error amplifier, and for amplifying a second difference voltage between the second reference voltage and the output voltage of the error amplifier; and wherein the efficiency varying means comprises a power supply current control circuit for producing a supply current which varies continuously with the second difference voltage.

17. A switching regulator according to claim 8; wherein the oscillator outputs a first periodic voltage signal having a first frequency and a second periodic voltage signal having a second frequency higher than the first frequency; and further comprising a reference voltage generating circuit for generating a second reference voltage, a second comparator for comparing the second reference voltage with the voltage output by the difference amplifier, and an oscillator control circuit for controlling the oscillator so that the oscillator generates the first periodic voltage signal when the output voltage of the difference amplifier is lower than the second reference voltage, and for generating the second periodic voltage signal when the output voltage of the difference amplifier is higher than the second reference voltage.

18. A switching regulator according to claim 8; wherein the oscillator comprises a voltage-controlled oscillator circuit for producing a periodic voltage signal having a frequency which varies in response to a control voltage supplied to a control voltage input; and further comprising a reference voltage circuit for generating a second reference voltage, and a second difference amplifier for receiving the second reference voltage and the voltage output by the first difference amplifier, and for amplifying a second difference voltage between the second reference voltage and the output voltage of the first difference amplifier; and wherein the voltage-controlled oscillator circuit includes means for varying the frequency of the periodic voltage signal continuously in response to the second difference voltage.

19. A switching regulator according to claim 8; further comprising a reference voltage circuit for generating a second reference voltage, a second comparator for comparing the second reference voltage with the voltage output by the error amplifier, and a power supply current control circuit connected to a power supply circuit of at least one of the error amplifier and the PWM comparator for supplying a first current to the respective power supply circuit when the error amplifier output voltage is lower than the second reference voltage and for supplying a second current different from the first current when the difference voltage is higher than the second reference voltage.

20. A switching regulator according to claim 8; further comprising a reference voltage circuit for generating a second reference voltage, a second error amplifier for receiving the second reference voltage and the voltage output by the error amplifier, and for amplifying a second difference voltage between the second reference voltage and the error amplifier output voltage, and a power supply current control circuit connected to a power supply circuit of at least one of the error amplifier and the PWM comparator for continuously varying the supply current in response to variations in the second difference voltage.

* * * * *